United States Patent [19]
Szmauz et al.

[11] Patent Number: 5,517,533
[45] Date of Patent: May 14, 1996

[54] PARALLEL IMPLEMENTATION OF RUN LENGTH CODING APPARATUS AND METHOD

[75] Inventors: Richard L. Szmauz, New Ipswich, N.H.; Anthony G. Lauck, Wellesley, Mass.

[73] Assignee: Digital Equipment Corporation, Maynard, Mass.

[21] Appl. No.: 350,491

[22] Filed: Dec. 6, 1994

Related U.S. Application Data

[63] Continuation of Ser. No. 845,673, Mar. 4, 1992.

[51] Int. Cl.$^6$ .................................................. H04L 7/00
[52] U.S. Cl. ..................... 375/354; 375/363; 370/102; 370/111; 358/261.1; 341/59
[58] Field of Search ..................................... 375/363, 249, 375/250, 354; 370/102, 110.4, 111, 110.1, 94.1; 358/261.1; 341/59; 327/94

[56] References Cited

U.S. PATENT DOCUMENTS

| | | | |
|---|---|---|---|
| 3,624,637 | 11/1971 | Irwin | 340/347 DD |
| 4,261,035 | 4/1981 | Raymond | 364/200 |
| 4,327,379 | 4/1982 | Kadikia et al. | 358/261.1 |
| 4,346,440 | 8/1982 | Kyu et al. | 364/200 |
| 4,387,364 | 6/1983 | Shirota | 340/347 DD |
| 4,488,143 | 12/1984 | Martin | 340/347 DD |
| 4,779,072 | 10/1988 | Van Gestel | 341/59 |
| 4,833,470 | 5/1989 | Iketani | 341/59 |
| 4,851,837 | 7/1989 | Baldwin | 341/55 |
| 4,937,573 | 6/1990 | Silvio et al. | 341/59 |
| 5,007,045 | 4/1991 | Tsuzuki | 370/94.1 |
| 5,060,242 | 10/1991 | Arbeiter | 358/261.1 |
| 5,121,205 | 6/1992 | Ng et al. | 358/133 |

OTHER PUBLICATIONS

*Computer Networks,* Second Edition, Andrew S. Tanenbaum, Vrije Universiteit, Amsterdam, the Netherlands, pp. 494–495.

*Primary Examiner*—Stephen Chin
*Assistant Examiner*—T. Ghebretinsae
*Attorney, Agent, or Firm*—Kenneth F. Kozik

[57] ABSTRACT

Apparatus and method for realizing a parallel implementation of run length coding. The system encodes control and data information into the respective link control and data streams and merges the same onto the communication link for transmission. In addition, the system separates link data information from control information upon receipt of the information stream and decodes the received link data and control information into the original information.

4 Claims, 9 Drawing Sheets

RLS SCANNER TRUTH TABLE
SCAN-RIGHT SECTION

| BINARY INPUT | | | | BINARY OUTPUT C2 | | | OUTPUT CONVERTED TO DECIMAL |
|---|---|---|---|---|---|---|---|
| D0 | D1 | D2 | D3 | | | | |
| 0 | 0 | 0 | 0 | 0 | 0 | 0 | 0 |
| 0 | 0 | 0 | 1 | 0 | 0 | 0 | 0 |
| 0 | 0 | 1 | 0 | 0 | 0 | 0 | 0 |
| 0 | 0 | 1 | 1 | 0 | 0 | 0 | 0 |
| 0 | 1 | 0 | 0 | 0 | 0 | 0 | 0 |
| 0 | 1 | 0 | 1 | 0 | 0 | 0 | 0 |
| 0 | 1 | 1 | 0 | 0 | 0 | 0 | 0 |
| 0 | 1 | 1 | 1 | 0 | 0 | 0 | 0 |
| 1 | 0 | 0 | 0 | 0 | 0 | 1 | 1 |
| 1 | 0 | 0 | 1 | 0 | 0 | 1 | 1 |
| 1 | 0 | 1 | 0 | 0 | 0 | 1 | 1 |
| 1 | 0 | 1 | 1 | 0 | 0 | 1 | 1 |
| 1 | 1 | 0 | 0 | 0 | 1 | 0 | 2 |
| 1 | 1 | 0 | 1 | 0 | 1 | 0 | 2 |
| 1 | 1 | 1 | 0 | 0 | 1 | 1 | 3 |
| 1 | 1 | 1 | 1 | 1 | 0 | 0 | 4 |

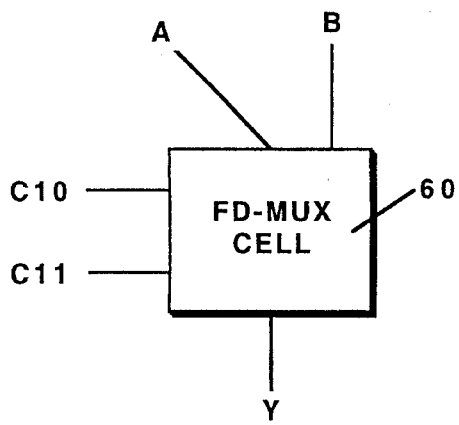
Fig. 5A
FB-MUX CELL TRUTH TABLE
| INPUT | | OUTPUT |
|---|---|---|
| C11 | C10 | Y |
| 0 | 0 | 0 |
| 0 | 1 | A |
| 1 | 0 | B |
| 1 | 1 | DON'T CARE |
Fig. 5B
Fig. 6
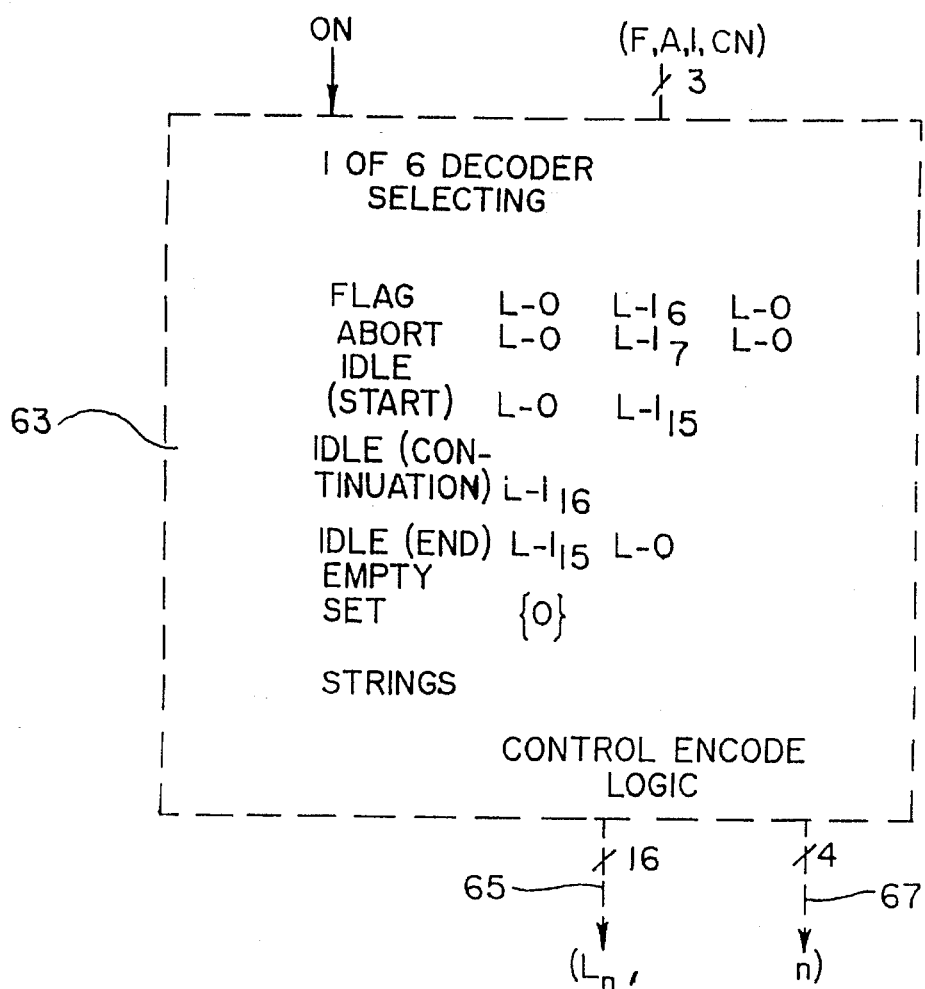

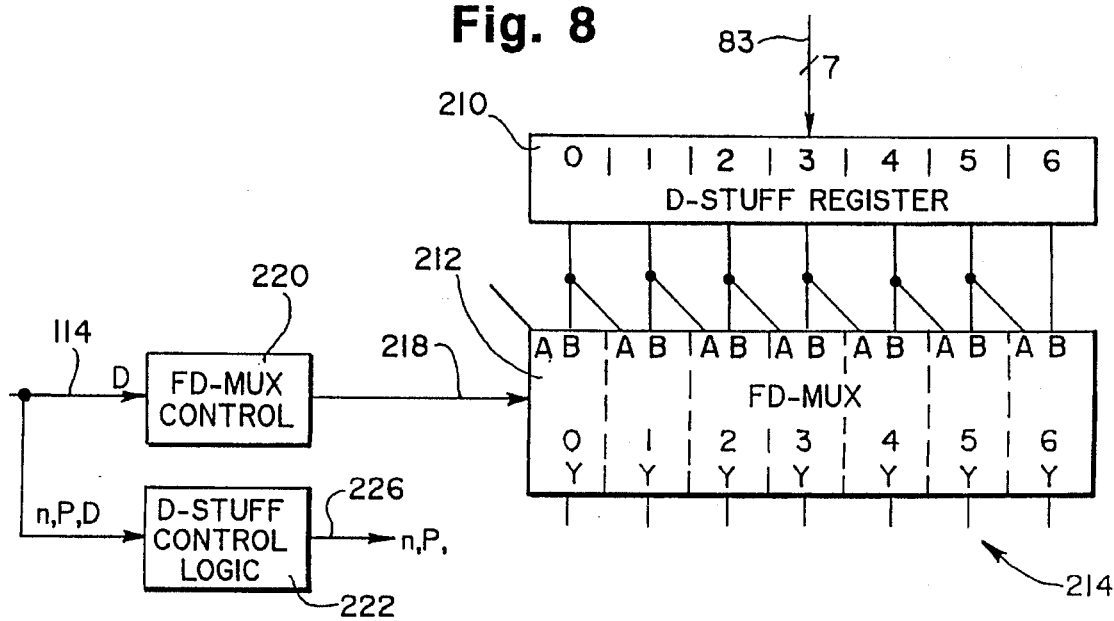
Fig. 8
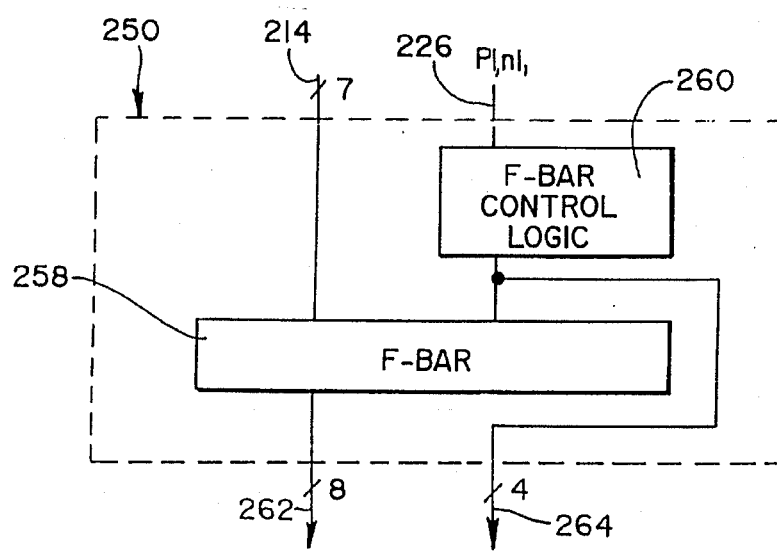
Fig. 9A
FD-MUX CELL TRUTH TABLE
| INPUT (C) | OUTPUT (Y) |
|---|---|
| 0 | A |
| 1 | B |
Fig. 9B
Fig. 10

PARALLEL IMPLEMENTATION OF RUN LENGTH CODING APPARATUS AND METHOD

This application is a continuation of application Ser. No. 07/845,673 filed on Mar. 4, 1992.

FIELD OF THE INVENTION

The present invention relates to bit-oriented data link protocols used in the transmission of information in high speed wide area data links, and more particularly to a parallel implementation of run length coding for control stream and data stream discrimination in the transmission of information over a transmission link directly connecting individual computers or over the transmission links of a computer network. The present embodiment addresses specifically the parallel implementation of High Level Data Control (HDLC), ISO Standard 3309.

The term "run length code" or "run length coding" as it pertains to the family of bit oriented protocols discussed as part of this application does not exist in communication systems literature. However, such terms are used in the context of image processing describing a data compression technique. The terms "run length code" or "run length coding" are re-coined to identify the set of codes addressed here, of which High Level Data Link Control (HDLC) is a subset. These codes are also known as "bit stuffing" codes.

BACKGROUND OF THE INVENTION

Data communications systems comprise data communications equipment and data processing equipment connected together by data transmission links. Information is transmitted over these data transmission links in a serial fashion from one device to another in the form of a stream of information which has an identifiable beginning and end. This serial stream of information contains not only data information which includes the origin and/or destination of the data and information indicating the type of data being conveyed, but also control information which includes information designating the beginning and end of the stream. Before transmission, the data information and the control information are merged together to create one stream of information called the control/data stream.

Bit-oriented data link protocols are a set of predetermined agreements governing the exchange of information. One type of bit oriented protocol is based on a run length code which is used to efficiently merge, and subsequently separate, the control information from the data information before and after transmission on the communications link. The run length code contains a number of ones or zeroes appearing in a certain predetermined sequence. This specified sequence of ones and zeroes provides a way to distinguish between the control information and the data information received.

A symmetrical run length code specifies the maximum run length of both ones and zeroes which can occur during the active state of information transmission. Since a symmetrical run length code guarantees a minimum transition density of ones and zeroes for all data and control streams in the active state, clocking information can be encoded. When idle control information is being transmitted in the idle state, there is no upper bound to the run length of ones or zeroes transmitted. These codes are DC unbalanced.

Symmetrical run length codes are a by-product of the development of the present embodiment. They are identified as a result of the creation of a formal description of ISO 3309 in order to allow the algorithmic manipulation of ISO 3309 constructs. This is a necessary step in developing a parallel implementation of HDLC coding and the resultant family of symmetrical run length codes is mentioned here for completeness, however, they will not be discussed in any greater detail. Of the general category of run length codes identified, HDLC falls into a second class of run length codes defined here as asymmetrical run length codes.

Asymmetrical run length codes are those that specify either a maximum run length of ones or a maximum run length of zeroes in the active, non-idle state. Since asymmetrical run length codes only guarantee a maximum number of ones in a zero field, or vice versa, they cannot effectively encode clocking information. HDLC limits the number of ones in a zero field. Asymmetrical run length codes are also DC unbalanced.

In HDLC, a flag field is placed at the beginning and the end of the control/data stream to indicate to the receiver when a new stream of data begins and to indicate when the stream of data ends. In HDLC, one control/data stream is called a packet or a frame. Other control symbols are used to abort frames and change line state. The flag field is defined as a unique pattern of ones and zeroes comprising 01111110. The receiver recognizes this pattern as control information and operates accordingly. The frame, however, also contains data information in the form of ones and zeroes whose pattern can be entirely arbitrary. Consequently, it is possible that the flag field pattern, 01111110, could appear at any time during the transmission of data information. If the receiver recognizes this pattern as a frame field instead of the data it represents, the data transmission would be destroyed. To prevent this problem, an operation called "bit stuffing" is used.

The original data stream is altered by placing ("stuffing") a zero bit in the sequence of ones so that the receiver can distinguish data information from control information. This procedure facilitates the subsequent reconstruction of the originally separate control and data streams. The procedure defines an upper bound for the number of ones which appear in a row in data information being transmitted. Above this run length boundary, control information is being transmitted, below or at this boundary data information is being transmitted. This boundary value is set to five in HDLC.

Any segment of the data stream with a run length of ones greater than or equal to this boundary value will be stuffed with a zero bit before being merged with the control stream and consequently passed to the link for transmission. This process keeps all data streams of ones at or below the control/data run length boundary. Control information is encoded into control streams with run length values above the specified run length boundary.

There is a complementary stuffed bit deletion process used on the receive end of the data stream for removing the stuffed bit. The deletion process is invoked after the control/data streams are separated, thereby restoring the original data stream by removing all of the stuffed bits that were added before the transmission of information began.

The processes used to transmit and receive information are as follows:

1. Run length encoding of the control and data streams into the respective link control and data streams. The control stream is directly encoded into run lengths greater than the run length boundary, and the data stream is encoded into run length streams at or below the run length boundary with stuffed zero bits.

2. Merging the link control and data streams together and placing the control/data stream onto the communications link for transmission.

3. Separating the link control stream from the link data stream using the run length boundary as the discriminator.

4. Run length decoding the link control and data streams into the respective control stream and data stream. The link control stream is directly decoded into the original control stream. The link data stream is decoded, through the deletion of the stuffed zero bits, into the original data stream.

In traditional serial implementations of run length coding, all of the encoding and decoding related processes must run at the speed of the communications link. Many communications links currently operate in the one-hundred mega-bit per second to one giga-bit per second range, and consequently, serial coding processes servicing such links must operate in the one-hundred MHz to one GHz range. While current high speed (low density) technologies are available for implementing these high speed processes, they are more costly than high density (low speed) technologies. The advantage of a parallel implementation of run length coding at a particular link speed is that it can be implemented using a lower cost (high density) technology operating at a lower speed than the link. By devising a spatial decomposition of the required coding processes, this parallel processing based implementation is facilitated.

SUMMARY OF THE INVENTION

The present invention is an apparatus and method for realizing a parallel implementation of run length coding. The present invention provides a system for encoding control and data information into the respective link control and data streams and for merging same onto the communications link for transmission. Also disclosed is a system for separating link data information from control information upon receipt of the information stream and for decoding the received link data and control information into the original information.

The parallel implementation of run length coding enables high density, low cost technology to be used in the construction of the apparatus. By relaxing the constraints in the time domain (lowering clock rates) of the processing apparatus and tightening the constraints in the spatial domain (requiring higher gate densities) more cost effective designs can be realized. The parallel implementation approach thus expands the encode/decode problem spatially and by doing so takes advantage of the time/space tradeoffs so that coding processes can, in effect, work smarter, not harder, in keeping pace with communication link operating speeds.

DESCRIPTION OF THE DRAWINGS

FIG. 5 illustrates an FB-MUX cell and a truth table illustrating the operation of the FB-MUX cell.

FIG. 6 is a high level schematic representation of a control stream encode mapping process.

FIG. 8 is a schematic of the circuitry used to delete the bits previously stuffed in the data/control information.

FIG. 9 illustrates an FD-MUX cell and a truth table illustrating the operation of the FD-MUX cell.

FIG. 10 is a high level schematic representation of an alignment processor.

DESCRIPTION OF THE PREFERRED EMBODIMENT

Figure 1:
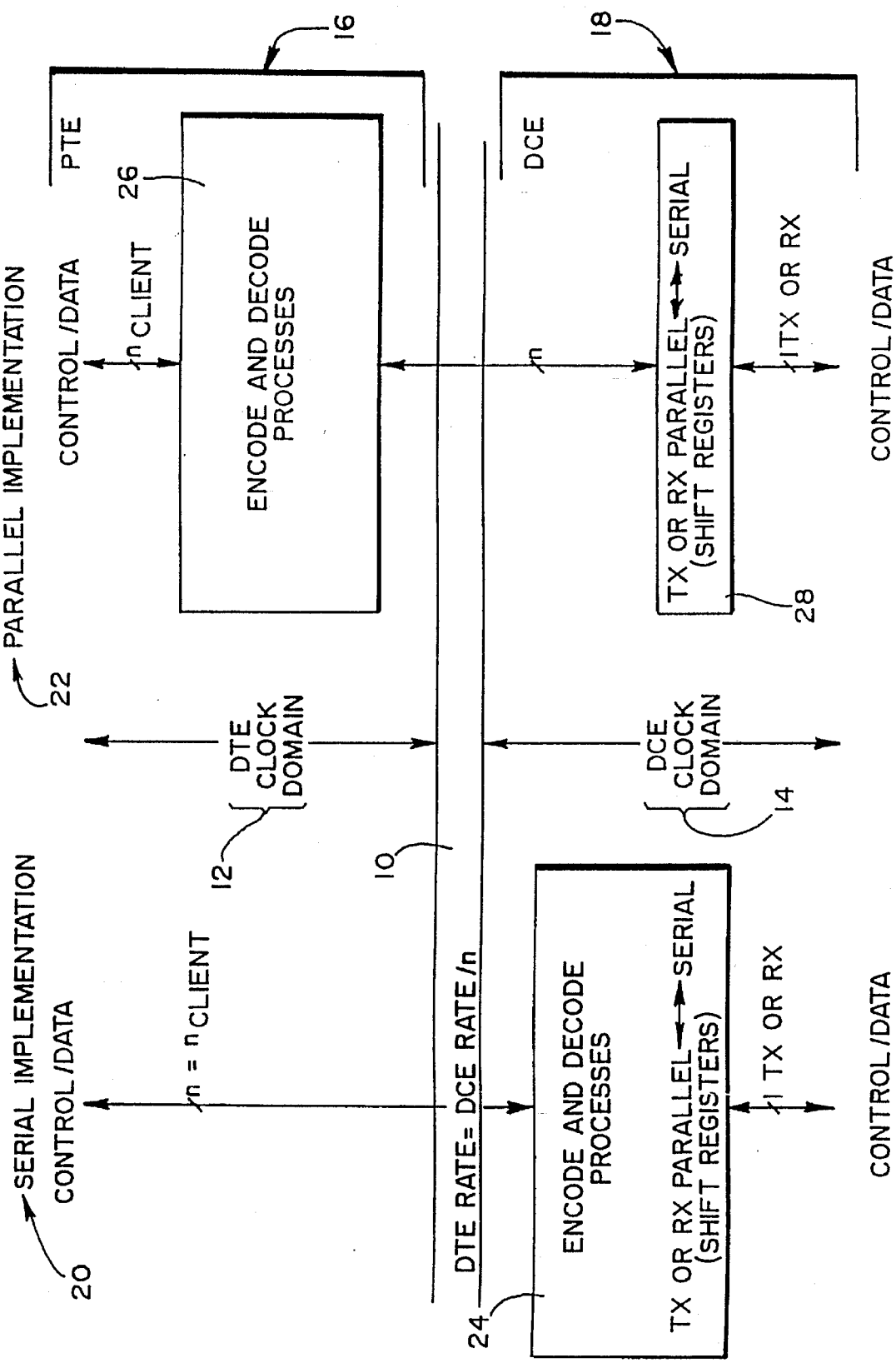
FIG. 1 is a schematic representation of the differences between a serial implementation of encoding and decoding functions and a parallel implementation of encoding and decoding functions of the present invention.

FIG. 1 illustrates schematically the differences between serial and parallel implementations of the encoding and decoding functions with respect to the locations of those functions in relationship to the clock domains in traditional communications systems. Also shown is the extent of the clock domain for the communications link comprising data communications equipment (DCE), operating at its rate and phase, and the extent of the clock domain for the processing equipment comprising data terminal equipment (DTE), operating at its rate and phase. The data communications equipment clock domain encompasses the DCE and runs at a rate equal to the bit rate of the DCE transmission facilities. The data terminal equipment clock domain encompasses the DTE and runs at a rate determined by the characteristics (processor speed, memory speed) of the particular DTE (router, bridge, etc.).

As seen in FIG. 1, a clock domain boundary 10 divides a DTE clock domain 12 from a DCE clock domain 14. The clock domain boundary 10 illustrates the point at which information is transferred between the clock domain of transmission equipment 16 and communication equipment 18. The clock domain boundary defines the physical boundary between the DTE and DCE herein. At the boundary 10, a change in clock domain is made to enable the DTE to communicate with the DCE. The boundary 10 exists for both the serial implementation 20 to the left of the DTE/DCE clock domain lines 12 and 14 and for the parallel implementation 22 shown to the right of the DTE/DCE clock domain lines 12 and 14. The phase relationship between the two clock domains may be variable and is undefined. The maximum required clock rate of the DTE clock domain is equal to the clock rate of the DCE clock domain divided by n where n equals the minimum number of control/data information bits that may be transferred across the clock domain boundary.

In the serial implementation 20, all of the encode and decode processes 24 occur in the DCE clock domain 14, in addition to changing the transmitted data (Tx) from a parallel to a serial format and changing the received data (Rx) from a serial to a parallel format through the use of shift registers as would be understood by one skilled in the art. In most serial designs n=8.

In the parallel implementation, the encode and decode processes 26 occur in the DTE clock domain 12 while the parallel to serial shifting of Tx and the serial to parallel shifting of Rx occur in shift registers 28 in the DCE clock domain 14. For the present embodiment, n is equal to eight for data transmission and seven for data reception, $n_{client}=8$.

NOTATION

The operation of the parallel encoding and decoding processes will be described using the notation illustrated in this section. This notation is used to reference the information in the two control/data domains which source information to and sink information from the encoding and decoding functions in the system.

The two major notation sets refer to the control/data streams of the client and link domains. The client domain encompasses all client control/data streams that the DTE is ready to have encoded to the link domain (pre-encode) or have been decoded from the link domain (post-decode). Conversely, the link domain encompasses all the link control/data streams that have been encoded from the client domain (post-encode) or are ready to be decoded to the client domain (pre-decode).

A third notation is used to describe the bits on the physical channel. This notation is a subset of the link domain.

CLIENT DOMAIN

Client Data Streams

Client data streams are made up of streams of concatenated client data strings $C\text{-}\{0|1\}_n$ which are in turn made up of client data bits (C-bits), at the lowest defined level. Client data streams are mapped to/from link data strings (see link domain below). These bit strings constitute higher level weighted and un-weighted constructs in DTE system memory, represented by bytes, words, etc. In this embodiment, these high level constructs are mapped onto client strings segmented into eight bit quantities called octets. The term byte usually connotes an eight bit quantity, but there are exceptions, while the term octet unambiguously defines an eight bit quantity. In addition, the term octet does not suggest any particular mapping relationship to higher level constructs or representations. Octets refer to the smallest grouping of C-bits of interest in the client data domain. Octets carry information in terms of their ordered exchange between transmitters and receivers with bit order maintained. Octets are not intrinsically weighted representations of information.

An input null value is also needed (in both the control and data streams) if separate control and data paths are provided in the system so that control symbols can be encoded/decoded without interference from the data path and vice versa.

| | | |
|---|---|---|
| C-bit | = 0\|1 | ;client data bit |
| $C_n$ | = C-bit$_1$ ... C-bit$_n$ | ;generic client data string |
| C-$1_n$ | = $1_1$ ... $1_n$ | ;client data string of 1's |
| C-$0_n$ | = $0_1$ ... $0_n$ | ;client data string of 0's |
| DN | = Data Null | ;no valid data being passed on data path |

Client Control Streams

Client control streams in HDLC are made up of three symbols: Flag, Abort, and Idle. Client control streams are mapped to/from link control strings (see link domain below). These control symbols can be mapped on three bits in the client control domain.

| | |
|---|---|
| F = Flag | ;flags are used to delineate the start/end of packets |
| A = Abort | ;abort is used to prematurely terminate and then discard a packet |
| I = Idle | ;idle indicates that the channel is not active and is composed of the sub-symbols: Idle Start, Idle Continuation and Idle End. |
| CN = Control Null | ;no valid control being passed on control path |

LINK DOMAIN

Link control/data streams are made up of concatenated link control/data strings $(L|1\text{-}\{0|1\}_n)$ which are in turn made up of link control/data bits (L|1-bits), at the lowest defined level. These bit strings are also called code groups and are carried directly by DCE transmission facilities. Link data and control strings are variable length quantities as described in the following sections. Link strings are physically transmitted and received lower numbered bit first. This defines the logical order of bit transmission and reception within a client data octet to be also lower numbered bit first.

Link Data Streams

| | | |
|---|---|---|
| 1-bit | = 0\|1 | ;link data bit |
| $1_n$ | = 1-bit$_1$ ... 1-bit$_n$ | ;generic link data string |
| 1-$1_n$ | = $1_1$ ... $1_n$ | ;link data string of 1's |
| 1-$0_n$ | = $0_1$ ... $0_n$ | ;link data string of 0's |

Link Control Streams

| | | |
|---|---|---|
| L-bit | = 0\|1 | ;link control bit |
| $L_n$ | = L-bit$_1$ ... L-bit$_n$ | ;generic link control string |
| L-$1_n$ | = $1_1$ ... $1_n$ | ;link control string of 1's |
| L-$0_n$ | = $0_1$ ... $0_n$ | ;link control string of 0's |

Bits on the Physical Channel

| | | |
|---|---|---|
| bit | = 0\|1 | ;physical channel bit |
| $b_n$ | = $b_0$ ... $b_n$ | ;generic physical channel bit string |
| b-$1_n$ | = $1_0$ ... $1_n$ | ;physical channel bit string of 1's |
| b-$0_n$ | = $0_0$ ... $0_n$ | ;physical channel bit string of 0's |

ENCODING PROCESS

The encoding process maps the client control symbols into link control strings and the client data strings into link data strings. These link strings are then merged into physical channel bit values (0=L-0|1-0|1=L-1|1-1) before being transmitted.

Notation Oriented Encoding Description

Encode Mapping For ISO 3309:
  run length boundary = 5
  client data set = {$C_n$, DN}
  client control set = {F, A, I, CN}

Client Data → Maps To → Link Data
  C-$0_{n = [1,INF]}$ & CN    1-$0_n$
  C-$1_{n = [1,4]}$ & CN    1-$1_n$
  C-$1_{n = [5,INF]}$ & CN    1-$1_5$ 1-0 ... 1-$1_5$ 1-0 1-$1_n$ MOD 5
           1 ... m = INT(n/5)
  DN\|!CN              {0} = empty set Client Control → Maps To → Link Control
  F            & DN    L-0 L-$1_6$ L-0
  A            & DN    L-0 L-$1_7$ L-0
  I \| ! ( CN^DN)        L-0 L-$1_{[15,INF]}$ L-0
  CN & !DN            {0} = empty set
  INF = Infinity
  ! Logical Negation (NOT)            \| = Logical OR
  ^ = Logical Exclusive - OR (XOR)    & = Logical AND Encode String Merging Link Control/Data Strings → Merge To → Physical Channel

| Bits | |
|---|---|
| 1-$0_n$ ¦ L-$0_n$ | b-$0_n$ |
| 1-$1_n$ ¦ L-$1_n$ | b-$1_n$ |

Schematic Oriented Encoding Description
Data Encode Mapping

Figure 2:
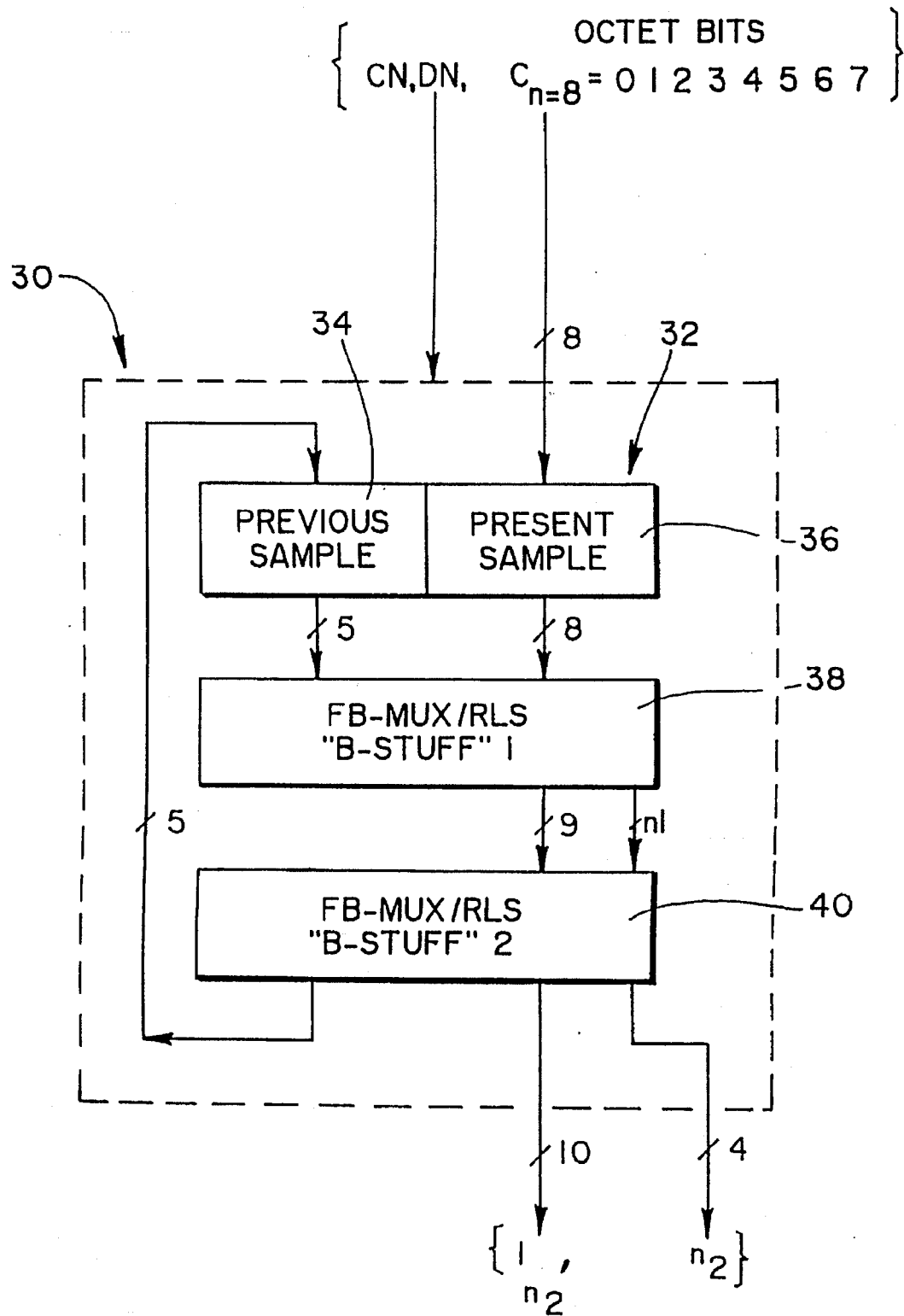
FIG. 2 is a high level schematic representation of an eight-bit parallel data stream encode mapping process.

FIG. 2 is a high level schematic representation of eight-bit parallel data stream encode mapping processes. The mapping process adds zero bits, as described previously, to the client (un-encoded) data stream so that the link (encoded) control stream and the link (encoded) data stream are distinguished from one another when processed by the receiver.

The path for data mapping is a straight forward one-to-one mapping for all the client data strings of a ones run length of less than or equal to four. For ones run lengths of greater than or equal to five, a zero bit is added to or stuffed in the string of bits. A parallel bit stuffing process is employed which comprises two functional elements: 1) parallel run length spatial scanners (RLS) and 2) fractional bit stuffing multiplexers (FB-Mux).

Figure 3:
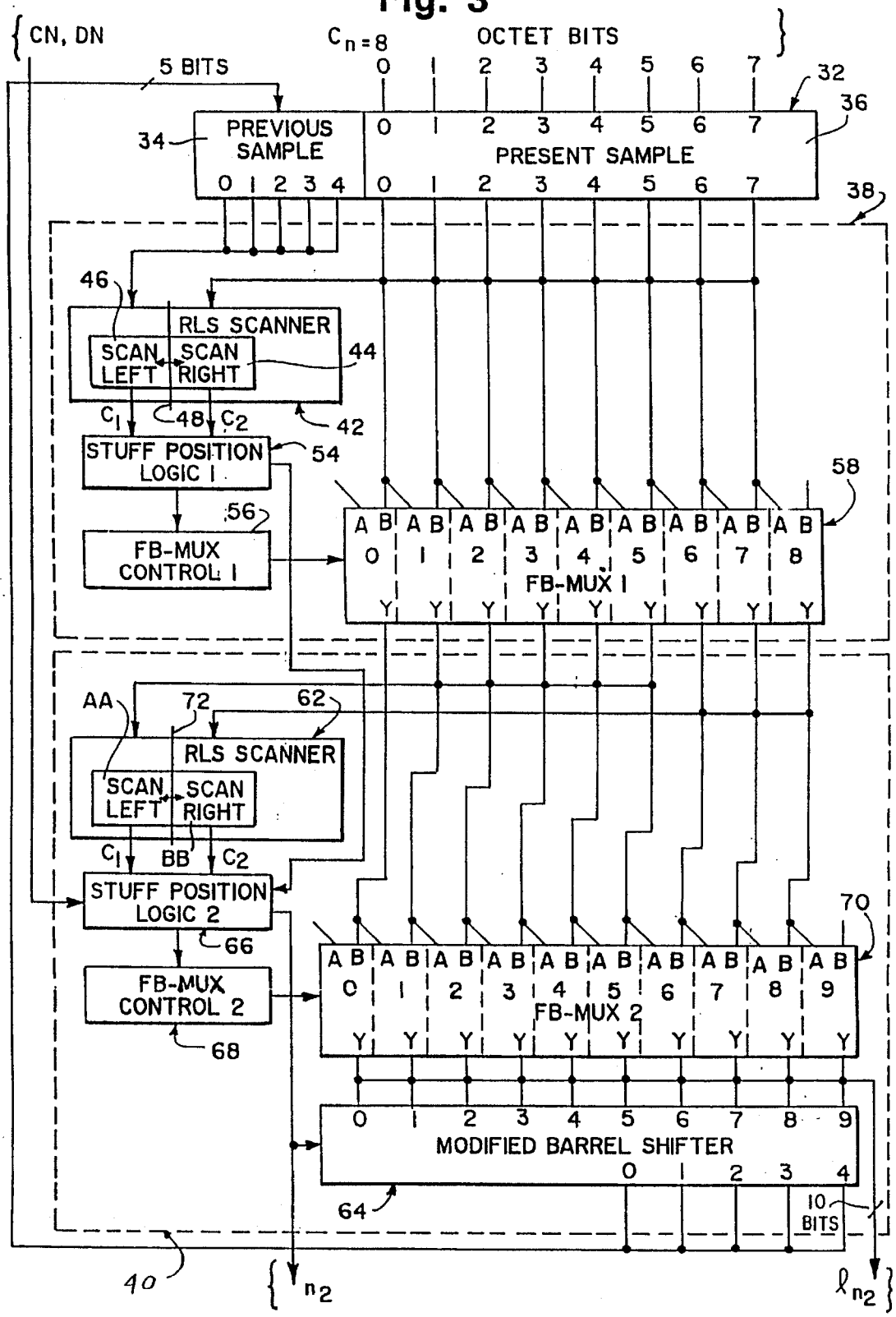
FIG. 3 is a schematic representation of the apparatus for the eight-bit parallel data stream encode mapping process.

As seen in FIG. 2, the data path mapping function 30 receives client data ($C_n$(Octet Bits 0→7 (Shown in transmission (left to right) order to make FIGS. 2 and 3 easier to understand. This is reverse from conventional parallel notation: Octet Bits 7→0.))) or null data (DN) when client data is not being sent. CN is also provided as an input. In this embodiment, client data is segmented into eight bit quantities of parallel data or octets. The client data is received by a sample and hold device 32 including a previous sample section 34 and a present sample section 36. The present sample section 36 holds a present sample of eight bits and the previous sample section 34 holds five bits. The previous sample is a sample of the last five bits of the output of the data path mapping function from the previous encoding cycle. The previous sample is necessary so that it is possible to detect a string of five one bits that lies across the previous/present sample boundary.

Two run length spatial scanners and two fractional bit-stuff multiplexers are required in the data path since there are two bit stuff opportunities in an eight bit sample. A first FB-Mux/RLS device 38 is coupled to the sample and hold device 32. The FB-Mux/RLS device 38 receives a present sample and a previous sample from the sample and hold device 32. Once the first FB-Mux/RLS device 38 has performed its operation, either an eight or nine bit parallel sample of information, indicated by signal n1, is sent to a second FB-Mux/RLS device 40. Whether eight or nine bits are sent depends on whether a stuffed zero bit was inserted in position zero through five of the present sample in the sample and hold device 32. The second FB-Mux/RLS device 40 determines whether a zero bit should be stuffed into position six through eight of the output of the first FB-Mux/RLS device 38.

Once the stuffing operation is completed, the second FB-Mux/RLS device 40 outputs either an eight, nine, or ten bit parallel sample of information, indicated by count field signal n2. Whether eight, nine, or ten bits is output depends on n1 and whether a stuffed zero bit was inserted in position six through eight. This resultant eight to ten bit link data string 1n, along with the count field signal n2 indicating the length of the link data string, is then sent to the Encode String Merging process, which merges link control with link data strings, and transmits them, lower numbered bit first. The Encode String Merging process is described later.

In practice the count field signal n2 is a count mask, which provides a more suitable means to count off the valid bits for transmission in high speed systems than a binary counter which the count field implies.

A modified barrel shifter, along with n2, is used inside FB-Mux/RLS device 40 to send the last five valid bits of the link data string back to the previous sample section 34 of the sample and hold device 32.

FIG. 3 illustrates in greater detail the sample and hold device 32, the first FB-Mux/RLS device 38 and the second FB-Mux/RLS device 40. The first FB-Mux/RLS device 38, as previously stated, receives a five bit previous sample and an eight bit present sample from the sample and hold device 32. The previous sample section 34 and the present sample section 36 of the sample and hold device 32 are coupled to a run length spatial scanner (RLS) 42. The present sample section 36 is also coupled to the FB-Mux 58. A scan-right RLS scanner section 44 of the RLS scanner 42 is coupled to the present sample section 36 of the sample and hold device 32 and receives the eight bit present sample. A scan-left RLS scanner section 46 is connected to the previous section 34 of the sample and hold device 32 and receives the five bit previous sample. The RLS scanner 42 counts the number of ones to the left and to the right of the dividing line 48 and produces output signals C1 and C2 which indicate these numbers.

Figures 4A, 4B:
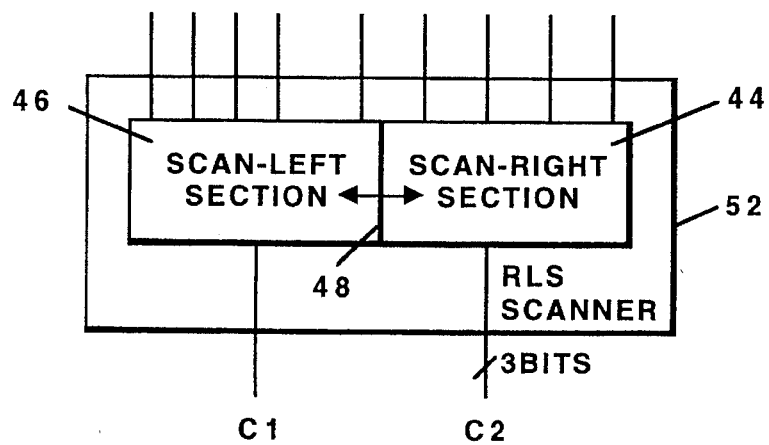
FIG. 4 illustrates a run length scanner four bits wide and a truth table illustrating the operation of the run length scanner.

One example of an RLS scanner is shown in FIG. 4. In the current embodiment, the scan-right RLS scanner section 44 length is eight bits. FIG. 4 illustrates a scan-right scanner section 44 for four bits to show the operation of the RLS scanner. A truth table illustrates the inputs to and the outputs from the scan-right RLS scanner section 44 for a four bit input sample comprising D0, D1, D2, and D3.

As seen in FIG. 3 and FIG. 4, the RLS scanner is divided into the scan-left and scan-right sections by a dividing line 48. The dividing line 48 is a boundary indicating the direction in which the bits of each sample are scanned. As shown in FIGS. 3 and 4, the scan-right sample is scanned from left to right starting at the dividing line 48. The scan-left sample is scanned from right to left from the dividing line 48. The scanning is done spatially and not sequentially. Consequently, combinatorial logic is used to determine the number of ones scanned.

Using FIG. 4 to illustrate the basic operation of the scan-right RLS scanner section 44, the input positioned immediately to the right of the dividing line 48, D0, marks the point at which the input sample is scanned to determine how many ones appear in a row.

As seen in the truth table, the number of ones in a row starting at D0 is calculated. For instance, when D0 and D1 are ones and D2 and D3 are zeroes, the RLS scanner generates the number 2. This calculation is made by the scan-right section 44 of RLS scanner 52 (in the illustrative example) which generates an output C2. In the RLS scanner 42 of FIG. 3 this calculation is performed by its respective scan-right section 44.

Since eight bits are scanned in the case of the RLS scanner 42, a truth table would have two hundred fifty-six different possibilities. The optimum combinatorial logic to realize this truth table could be generated by any one of a number of well known computer programs which generate logic circuits based upon the input of a truth table having input and output values given. The combinatorial logic to realize other simple combinatorial logic functions herein can be generated in a similar manner.

Additional logic is generated to yield a similar calculation of the number of ones which occur in a row in the sample input to the scan-left RLS scanner section 46 of FIG. 3 and FIG. 4 and is labeled C1.

Returning to FIG. 3, C1 and C2 are passed to a stuff position logic 1 54 which determines the location, if any, where a zero bit will be stuffed.

The stuff position logic 1 54 is coupled to an FB MUX control 1 56 which controls the operation of an FB MUX 1 58. The FB MUX 1 58 receives bits from the present sample section 36 of the sample and hold device 32 and through commands received from the FB MUX control 1 56, it may insert a zero bit into the present eight bit sample currently being operated upon.

The FB-Mux 58 has 18 input lines numbered 0, A and B, through 8, A and B, from left to right. Each input 0B through 7B is coupled directly to a like numbered output, 0 through 7, of the present sample section 36 of the sample and hold device 32. In addition, the inputs 1A through 8A are coupled to outputs 0 through 7 of the present sample section 36 of the sample and hold device 32. Inputs 0A and 8B are not used and therefore are left unconnected.

FB-MuX 1 58 comprises a number of FB-Mux cells 60, one of which is illustrated in FIG. 5. The FB MUX cell 60 has two control input lines, control input zero (CI0) and control input one (CI1). These inputs are connected to the FB MUX control 1 56. Two data inputs are A and B each of which is connected to an appropriate output of the present sample section 36 of sample and hold device 32.

FIG. 5 contains a truth table illustrating how the control inputs are used to select an output at the Y output of the FB MUX cell. By using cells responding to these control inputs, a zero bit can be inserted or "stuffed" in the eight bit present sample, which requires the FB-Mux to be nine bits wide.

The stuff position logic 1 54 performs calculations which control the location of stuffing according to the following definitions and equations.

C1=Ones count from the scan-left RLS scanner section 46

C2=Ones count from the scan-right RLS scanner section 44

If 5–C1 is less than or equal to C2 then stuff a bit at position 5–C1 and set n1=9, otherwise do not stuff and set n1=8.

FOR EXAMPLE

Assume the following bits are located in the sample and hold device 32.

|  | PREVIOUS SAMPLE | PRESENT SAMPLE |
|---|---|---|
| POSITION | 0 1 2 3 4 | 0 1 2 3 4 5 6 7 |
| BIT VALUE | 0 1 1 1 1 | 1 1 1 1 1 1 1 1 |

In this example, C1=4 and C2=8.

Since 5–4 is less than 8, a bit is stuffed at position 1, and n1=9.

Consequently, the outputs of the FB MUX 1 58, zero through eight are as follows:

| OUTPUTS OF THE FB MUX 1 58 | |
|---|---|
| POSITION | 0 1 2 3 4 5 6 7 8 |
| BIT VALUE | 1 0 1 1 1 1 1 1 1 |

As shown, the zero bit is stuffed at the output bit position 1.

The following table indicates what control inputs are required at each cell to stuff a bit at the stated position. As shown, the cell preceding the cell at which a bit is stuffed have their control lines set so that B is the selected input. The cells following the cell at which a bit is stuffed have their control lines set so that A is the selected input. The cell at the location where the bit is stuffed generates a zero at the output. This table defines the operation of FB-Mux control 1 56.

| INPUT STUFF POSITION | OUTPUT CELL0 CI1-0 | CELL1 CI1-0 | CELL2 CI1-0 | CELL3 CI1-0 | CELL4 CI1-0 | CELL5 CI1-0 | CELL6 CI1-0 | CELL7 CI1-0 | CELL8 CI1-0 |
|---|---|---|---|---|---|---|---|---|---|
| 0 | 0 0 | 0 1 | 0 1 | 0 1 | 0 1 | 0 1 | 0 1 | 0 1 | 0 1 |
| 1 | 1 0 | 0 0 | 0 1 | 0 1 | 0 1 | 0 1 | 0 1 | 0 1 | 0 1 |
| 2 | 1 0 | 1 0 | 0 0 | 0 1 | 0 1 | 0 1 | 0 1 | 0 1 | 0 1 |
| 3 | 1 0 | 1 0 | 1 0 | 0 0 | 0 1 | 0 1 | 0 1 | 0 1 | 0 1 |
| 4 | 1 0 | 1 0 | 1 0 | 1 0 | 0 0 | 0 1 | 0 1 | 0 1 | 0 1 |
| 5 | 1 0 | 1 0 | 1 0 | 1 0 | 1 0 | 0 0 | 0 1 | 0 1 | 0 1 |
| NOT 0–5 | 1 0 | 1 0 | 1 0 | 1 0 | 1 0 | 1 0 | 1 0 | 1 0 | 1 0 |

The outputs of the FB MUX 1 58 are connected to the inputs to the second FB-Mux/RLS device 40, and n1 from stuff position logic 1 54 is connected to stuff position logic 2 66. The second FB-Mux/RLS device 40 includes an RLS scanner 2 62, a stuff position logic 2 66, FB-Mux control 2 68, FB-Mux 2 70 and a modified barrel shifter 64.

The functions of the above components are very similar to their counterparts in FB-Mux/RLS device 38. The one exception is the modified barrel shifter 64, whose function is described shortly. A dividing line 72 marks the point from which the RLS scanner 2 62 counts the number of ones in a row. The calculations performed by the stuff position logic 2 66 is as follows:

C1=ones count from the scan-left RLS scanner section AA

C2=ones count from the scan-right RLS scanner section BB

If 5–C1 is less than or equal to C2 then stuff a bit at position 5–C1+6 and set n2=n1+1, otherwise do not stuff and do not modify n1.

FOR EXAMPLE Assume the following bits are located in the FB-Mux 1 58.

|  | PRESENT SAMPLE |
|---|---|
| POSITION | 0 1 2 3 4 5 6 7 8 |
| BIT VALUE | 1 0 1 1 1 1 1 1 1 |

In this example, C1=4 and C2=3.

Since 5–4 is less than 3, a bit is stuffed at position 7, and set n2=10=9+1=n1+1.

Consequently, the outputs of the FB MUX 2 70, zero through nine are as follows:

| OUTPUTS OF THE FB-MUX 2 70 | |
|---|---|
| POSITION | 0 1 2 3 4 5 6 7 8 9 |
| BIT VALUE | 1 0 1 1 1 1 1 0 1 1 |

As shown, another zero bit is stuffed at the output bit position 7. The stuffed zero bit from the previous stuffing operation is also shown in position 1.

The following table illustrates the logic contained in FB-Mux control 2 68.

| INPUT | OUTPUT | | | | | | | | | |
|---|---|---|---|---|---|---|---|---|---|---|
| STUFF POSITION | CELL0 CI1-0 | CELL1 CI1-0 | CELL2 CI1-0 | CELL3 CI1-0 | CELL4 CI1-0 | CELL5 CI1-0 | CELL6 CI1-0 | CELL7 CI1-0 | CELL8 CI1-0 | CELL9 CI1-0 |
| 6 | 1 0 | 1 0 | 1 0 | 1 0 | 1 0 | 1 0 | 0 0 | 0 1 | 0 1 | 0 1 |
| 7 | 1 0 | 1 0 | 1 0 | 1 0 | 1 0 | 1 0 | 1 0 | 0 0 | 0 1 | 0 1 |
| 8 | 1 0 | 1 0 | 1 0 | 1 0 | 1 0 | 1 0 | 1 0 | 1 0 | 0 0 | 0 1 |
| NOT 6–8 | 1 0 | 1 0 | 1 0 | 1 0 | 1 0 | 1 0 | 1 0 | 1 0 | 1 0 | 1 0 |

Cells zero through five of FB-Mux 2 70 can be replaced by simple through connections since their B data inputs are always selected due to the fact that their control inputs are always set to 10.

The final function in the FB-Mux/RLS device 40 is a modified barrel shifter 64 which feeds back the last five valid bits of the link data string generated by FB-Mux 2 70 back to the previous sample section 34 of the sample and hold device 32, positions zero through four. If n2=8, outputs 3 through 7 of FB-Mux 2 70 are fed back, if n2=9, outputs 4 through 8 are fed back, and if n2=10, outputs 5 through 9 are fed back.

The design of the modified barrel shifter is a subset of a standard barrel shifter design and as such its construction and operation is understood by one skilled in the art.

Finally, regarding the data encode mapping process, if a DN (data null) is input to the data encode mapping process, or if a CN (control null) is not input to the date encode mapping process, n2 will be set to zero to indicate that no valid data is being generated.

Control Encode Mapping

FIG. 6 is a high level schematic representation of the control stream encode mapping process. As illustrated in FIG. 6, a one of six decoder 62 is used to map the Flag (F), Abort (A), Idle (I) and Control Null (CN) client control streams from the client domain to the link domain. DN is also provided as an input. The one of six decoder 63 is a decoder which receives the client control streams three bits in parallel and converts these to link control streams having up to sixteen bits in parallel ($L_n$) at a first output 65 corresponding to the previously stated mapping process for converting from client control streams to link control streams. The Idle Symbol is actually made up of three Idle sub-symbols which map to the Idle Link Control String components shown below. The Idle Link Control String components and the F, A and empty set {0} strings make up the six possible outputs of the one of six decoder 63.

| Idle Symbols | Idle Link Control String Components |
|---|---|
| Idle Start | L-0 L-1$_{15}$ |
| Idle Continuation | L-1$_{16}$ |
| Idle End | L-1$_{15}$ L-0 |

The one of six decoder has a second output 67 which outputs a four bit wide field indicating the number of valid link control stream bits (n) present in the sixteen bit wide output 65. In practice, a linear bit mask is used as was described in the Data Encode Mapping section. If CN is not input and DN is input to decoder 63, n is equal to the length of either an F, A or I. If CN is input and DN is not input to the control encode mapping process, output 67 (n) is zero. If both or neither CN and DN are asserted, this is considered an error condition and a sequence of Idle link control string components is generated to keep the link in a valid state.

The operation of the one of six decoder 63 is a straightforward mapping process and is understood by those skilled in the art.

Encode String Merging

The link data and control strings, along with their respective count fields that result from the previous mapping processes are sent to a simple shift register where they are loaded and serially transmitted over a communications link. Merging of the data and control streams occurs by the servicing of whatever link string, control or data, is available to the encode string merging process at any particular time, from the data and control encode mapping processes. The servicing of multiple parallel sources of information for the purpose of serial conversion of said information for subsequent transmission over a communications link is a multiplexing operation well understood by those skilled in the art and is therefore not illustrated.

DECODING PROCESS

The decoding process types physical channel bit values, separating them into either link control or link data strings. The separation process is accomplished through an extraction process that utilizes a string bonding algorithm based on run length discrimination. The link strings are then mapped back into the client control/data domain. A final alignment process is invoked in the client data path in order to re-construct the eight bit parallel data stream of the original client data strings.

Notation Oriented Decode Description

Decode String Extraction

All b–1 (n=[6,INF]) strings create "strong" (S) bonds to adjacent b–0's and are called strong strings.

All b–1 (n=[0,5]) strings create "weak" (W) bonds to adjacent b–0's and are called weak strings. Weak strings may or may not contain b–1's.

There is a one to one correspondence between link control strings and strong physical channel bit strings. There is also a one to one correspondence between link data strings and weak physical channel bit strings. Therefore, once the physical channel bits are typed into strong and weak strings the corresponding link strings are recovered.

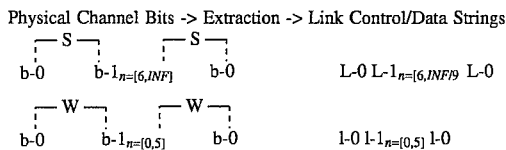

A strong bond to any b–0 takes precedence over any conflicting weak bond to the same b–0.

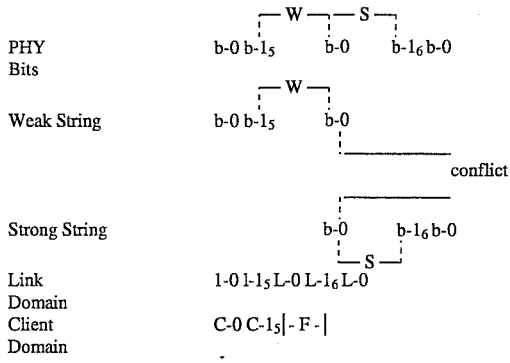

Adjacent control strings can share boundary b–0's or can contain their own b–0boundary values:

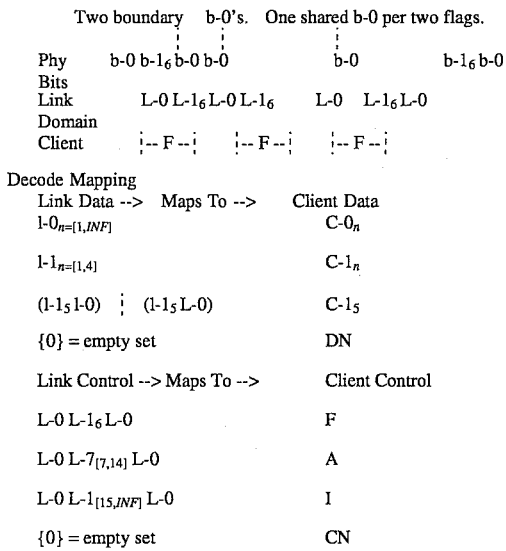

Schematic Oriented Decoding Description
Decode String Extraction and Mapping

Figure 7:
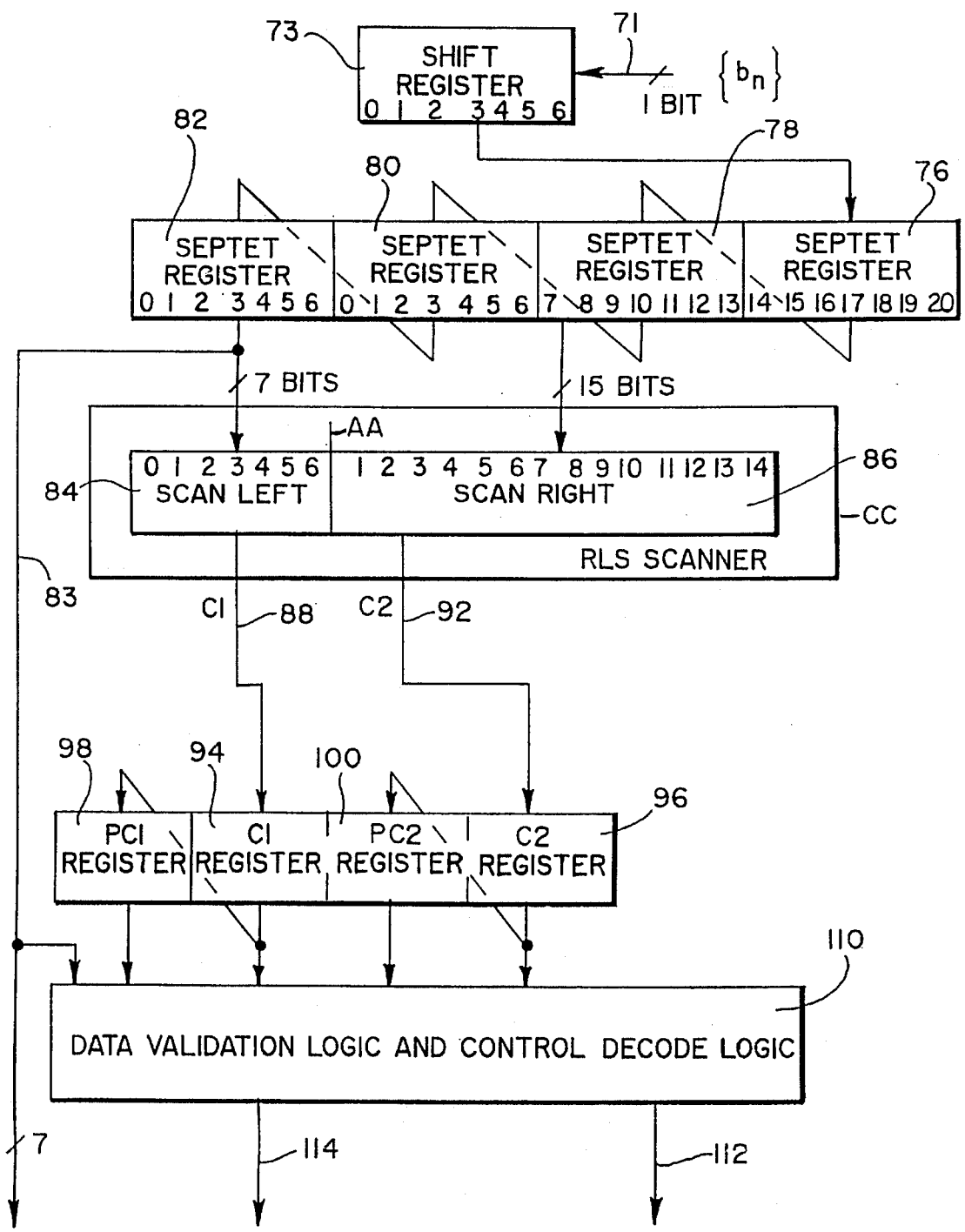
FIG. 7 is a schematic diagram of the apparatus for the control/data string extraction process.

FIG. 7 is a schematic diagram of the first control and data stream decode process, the link control/data string extraction process. The bits on the physical channel which are serially received are input to an input line 71 of a shift register 73, bit zero first. The shift register 73 converts the serially received bits into seven bit samples or septets. The bit sample is chosen to be seven since the system must be designed to deal with the highest parallel information rate possible and this condition occurs when receiving the shortest strings of interest, contiguous flags (six one bits) with shared boundary b–0's. (Though the use of shared b–0's is illegal in ISO 3309 link control stream encoding, compatibility with other (older) transmitter implementations is desired, in addition to the requirement that allowances must be made for physical layer error processes, which can create contiguous flags with shared boundary b–0's, though none may have been actually sent by the transmitter.)

Once the septets are formed, the septets are sent to a quad septet path through an output 74 of the shift register. The output 74 is coupled to a first septet register 76 which is coupled to a second septet register 78 which is coupled to a third septet register 80 which is coupled to a fourth septet register 82. The septets are shifted in a parallel fashion from each septet register to the next septet register in sequence starting at the first septet register 76 and ending at the fourth septet register 82. The fourth septet register 82 also outputs the current septet contained therein on a data output line 83. The use of this septet data is explained later in greater detail.

An RLS scanner CC is coupled to the septet registers. The scan-left RLS scanner section 84 receives the seven bits contained in the fourth septet register 82 and scans the bits received from bit six to zero, right to left, from the dividing line AA as illustrated. The scan-right RLS scanner section 86 is fifteen bits wide and receives fifteen bits from the first, second, and third septet registers 76, 78 and 80. As illustrated, the individual bit positions in the first, second, and third septet registers 76, 78 and 80 are numbered zero through twenty. The bits located at bit positions zero through fourteen are input to the scan-right RLS scanner section 86 in parallel and it scans the bits zero to fourteen, left to right, from the dividing line AA as illustrated.

Each run length spatial scanner section scans its input sample to the left or right of the dividing line AA to determine the number of consecutive one bits present, as previously described. The number of consecutive ones found in the scan-left RLS scanner section 84 is sent through a line 88 to C1 register 94. Likewise, the number of consecutive ones found in the scan-right RLS scanner section 86 is sent through a line 92 to C2 register 96.

Two previous count registers store, in the previous extraction cycle, the values from C1 register 94 and C2 register 96. PC1 register 98 then provides the value in C1 register 94, from the previous extraction cycle, as the value PC1 in the present extraction cycle. PC2 register 100 then provides the value in C2 register 96, from the previous extraction cycle, as the value PC2 in the present extraction cycle.

By re-using the values C1 and C2 in this manner, scan-left seven bit and scan-right fifteen bit run length counts from a virtual RLS scanner with dividing line BB are provided without the need for an actual second RLS scanner. The value PC1 represents a scan-left seven bit run length count to the left of dividing line BB, and the value PC2 represents a scan-right fifteen bit run length count to the right of dividing line BB.

The values of the counts C1, C2, PC1, and PC2, along with the value of the current septet, referred to as G, are transferred to data validation logic and control decode logic means 110. The data validation logic and control decode logic 110 takes the input values C1, C2, PC1, PC2 and G, and generates a control output signal at a control output 112. The control output signal 112 indicates the control content of the septet in septet register 82, which is the current septet being processed. The control output can be a value indicating the presence of a Flag (F), or Abort (A), or Idle (I), or Control Output Null (CN). A CN indicates that a control string does not begin in the current septet being processed.

Additional values indicating the data content of the current septet being processed are generated by the data validation logic and control decode logic 110 on a multi-bit signal output 114. Output 114 carries the following values:

n=number of valid bits in the current septet (n less than or equal to zero, or n greater than seven indicates null data (DN) and the fact that no valid data bits are present)

P=number of invalid prefix bits in the current septet

S=number of invalid suffix bits in the current septet

D=location of the position in the current septet to delete a previously stuffed zero bit in the range [0,5]

This information is utilized by a subsequent D-Stuff operation and is described shortly. Bit position six is handled as a special case by logic 110.

(D=−1 indicates a null stuff bit deletion condition since there is no zero bit in the range [0,5] to delete)

If both outputs 114 and 112 are not null (not CN and not DN), then this implies that, on the link, the data strings reported by logic 110 came before any control strings reported by logic 110. This is due to the fact that only seven bits are processed at any time by logic 110, and therefore it is not possible to decode even a minimum control string (Flag) followed by data in the same septet sample. If there is data in the current septet and a control string starts in the current septet, the only possible ordering of the two strings is data first followed by the control string.

The data validation and control decode logic generates the control output as previously defined and also generates the four values n, P, S, and D as previously defined. To generate these values, the data validation logic and control decode logic 110 operates on the values C1, C2, PC1, PC2 and G.

The following logic is used to perform the control decode function of data validation and control decode logic 110, setting control output 112 to the appropriate value. (The symbol "#" means "not equal.")

If G=1111111 then the control output 112 is set to CN or control null.

If G #1111111 then:

If C1+C2<6 then output CN

If C1+C2=6 then output Flag (F)

If C1+C2> or =7 and < or =14 then output Abort (A)

If C1+C2> or =15 then output Idle (I)

The following logic is used to perform the data validation function of data validation and control decode logic 110, setting output 114 to the appropriate value.

If PC1+PC2<6 then set P=0

If PC1+PC2> or =6 then set P=PC2+1

If G=0111110 then set S=1 (special case decode to D-Stuff position six)

If G #0111110 and C1+C2<6 then set S=0

If G #0111110 and C1+C2> or =6 then set S=C1+1 n=7−(P+S) (n less than or equal to seven, or n greater than or equal to one indicates a valid n. Any other value of n indicates null data (DN) Since there are no valid data bits present in G)

If PC1+PC2=5 and S #7−PC2 then set D=PC2

If PC1+PC2 #5 or S=7−PC2 the set D=−1

(D=−1indicates a null stuff bit deletion condition since there is no zero bit in the range [0,5] to delete)

The logic in 110 implements the above rules and thereby performs the string bonding algorithm, based on run length discrimination, that was previously presented in the subsection titled Decode String Extraction in the section titled Notation Oriented Decoding Description. Note that, although expressed as sequential rules, this logic can be implemented as concurrent→combinational logic.

After the data validation logic and control decode logic 110 has determined the values of n, P, S, D and the type of control output, the values n, P and D are passed on to a subsequent function to delete any previously stuffed zero bits in positions zero through five. S is only used internally by logic 110 to calculate n. The circuitry for performing the deletion of the stuffed bits is illustrated in FIG. 8.

The data output line 83 is seven bits wide in parallel. The seven bit wide sample is received by a D-Stuff register 210 having input bit values labeled zero through six from left to right as illustrated. The D-Stuff register 210 holds the current septet received from the septet register 82. Coupled to the register 210 is a Fractional Delete Stuff multiplexer (FD-Mux) 212 having a seven bit output 214. The FD-Mux 212 is capable of deleting stuffed bits in positions zero through five of the parallel sample contained in the D-stuff register 210. The FD-Mux 212 comprises seven FD-Mux cells 216, one of which is seen in FIG. 9. All B inputs of the individual FD-Mux cells 212 are connected to the corresponding bits in the D-stuff register 210, directly above each cell. The A inputs of the FD-Mux cells one through six are connected to bits zero through five of the D-stuff register 210, which are one bit to the left of each cell. The operation of an FD-Mux cell is illustrated by the truth table in FIG. 9.

A control input line 210 couples the FD-Mux 212 to an FD-Mux control 220. Each FD-Mux cell is coupled to a separate control input line (CI) 218 shown as a single line for purposes of illustration in FIG. 8. The FD-Mux control 220 receives the value D, the D-stuff bit position from the line 114 of the data validation logic and control decode logic 110. The FD-Mux control 220 upon receipt of the D-stuff position controls the operation of the individual FD-Mux cells through the control line 218 according to the truth table which follows. A stuffed bit located at a position indicated by the value of D is removed by the operation of the FD-Mux 212.

As shown, the cells at or preceding the D-stuff position have their control lines set so that A is the selected input, thereby shifting the bits from the D-stuff register 210 to the right and removing the bit at the D-stuff position. The cells following the D-stuff position have their control lines set so that B is the selected input, thereby passing on the corresponding bits from D-stuff register 210 with no change in position, as expected.

| INPUT | OUTPUT | | | | | | |
|---|---|---|---|---|---|---|---|
| D-STUFF POSITION | CELL0 CI | CELL1 CI | CELL2 CI | CELL3 CI | CELL4 CI | CELL5 CI | CELL6 CI |
| 0 | 0 | 1 | 1 | 1 | 1 | 1 | 1 |
| 1 | 0 | 0 | 1 | 1 | 1 | 1 | 1 |
| 2 | 0 | 0 | 0 | 1 | 1 | 1 | 1 |
| 3 | 0 | 0 | 0 | 0 | 1 | 1 | 1 |
| 4 | 0 | 0 | 0 | 0 | 0 | 1 | 1 |
| 5 | 0 | 0 | 0 | 0 | 0 | 0 | 1 |
| NOT 0–5 | 1 | 1 | 1 | 1 | 1 | 1 | 1 |

A D-Stuff control logic 222 receives as input the values of n, P and D from the line 114 of the data validation and control decode logic 110. The D-Stuff control logic 222 generates the values $n_1$ and $P_1$ on output 226.

If D> or =0 and < or =5 then set $P_1$=P+1 and $n_1$=n−1

If D<0 or D>5 then set $P_1$=P and $n_1$=n

At this point a variable length client data string has been recovered from the septet stream by the D-Stuff process. This variable length client data string is then transferred to an alignment process 250 illustrated in FIG. 10.

The alignment process reconstructs the eight bit parallel data stream of the original client data strings. The alignment process 250 receives the seven bit septet output from the output 214 of the FD-Mux 212. Additionally, the alignment process 250 also receives the value of the number of invalid prefix bits, $P_1$, and the number of valid data bits in the septet, $n_1$, from the output 226 of FIG. 8.

The alignment process 250 includes a fractional barrel shifter 258 (F-Bar) and F-Bar control logic 260. The alignment process 250 includes a parallel eight bit output 262 to output the reconstructed octet and a parallel four bit output 264 to indicate the number of bits that have been collected at any time. Each time eight or more bits are recovered, an octet can be read from output 262.

Figure 11:
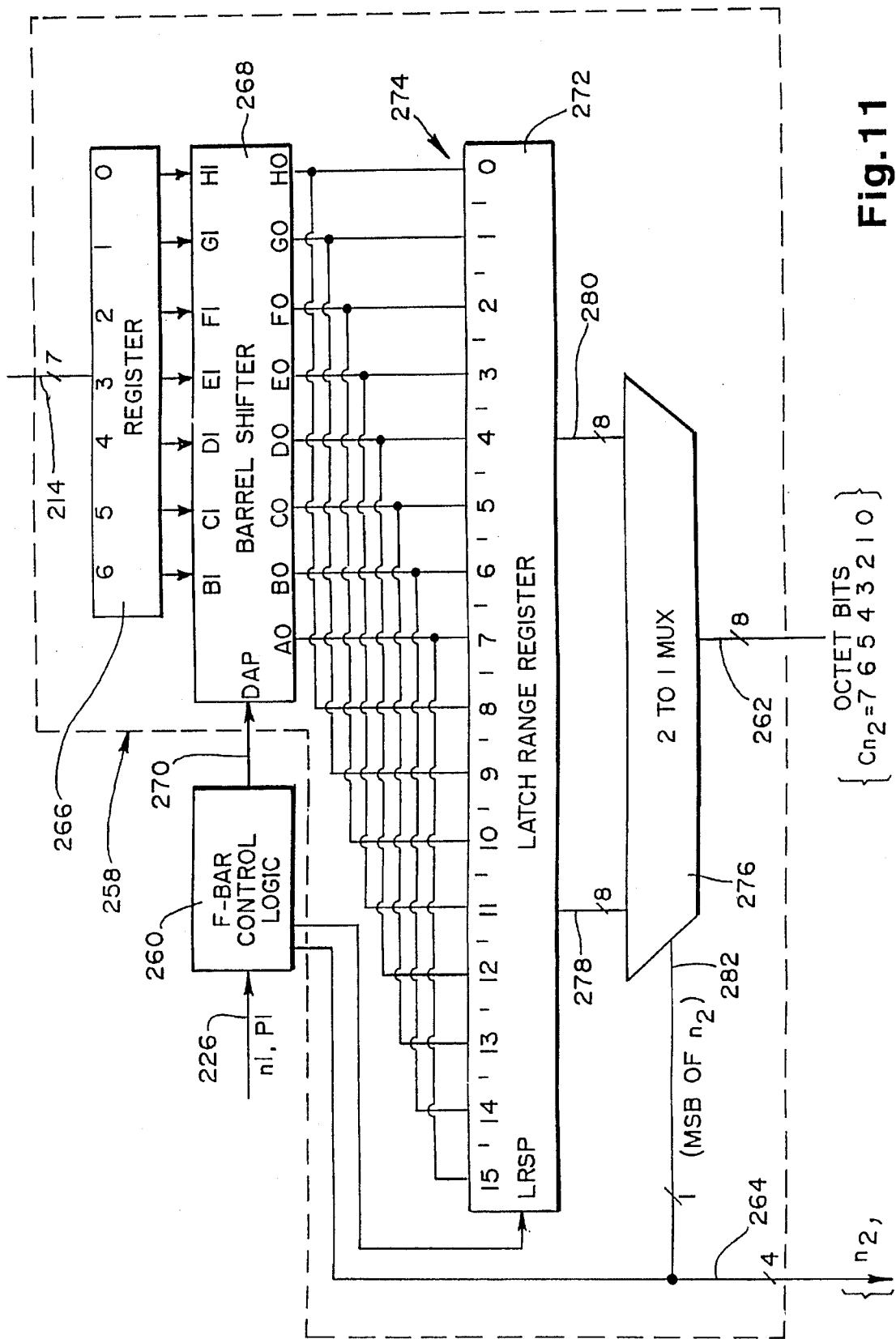
FIG. 11 is a schematic diagram of a fractional barrel shifter.

FIG. 11 illustrates the structure of the F-Bar 258. The F-Bar 258 includes a register 266 for receiving the seven bit parallel sample from output 214 of the FD-Mux 212 of FIG. 8. The seven bit parallel sample is shown in the conventional notation of bit six to bit zero, left to right, as opposed to reception order (bit zero to bit six, left to right). Reception order was used to make the previous descriptions of string extraction and mapping functions easier to understand. The alignment process is more clearly illustrated if conventional parallel bit ordering is used since the output of the process is an octet depicted in conventional notation (bit seven to bit zero, left to right). The register 266 is coupled to a barrel shifter 268 through seven lines for passing the current seven bit data sample. The barrel shifter is used to align the received seven bit samples into octets. Each input to the barrel shifter 268 is labeled respectively from left to right as BI, CI, DI, EI, FI, GI, and HI. The barrel shifter 268 additionally includes eight output lines AO, BO, CO, DO, EO, FO, GO, and HO.

The F-Bar control logic 260 supplies control information to the barrel shifter 268 over a line 270. the information received by the barrel shifter 268 is the data alignment position, the point at which the input septet will be presented to a latch range register 272. As seen, a plurality of inputs 274 to the register 272 is sixteen bits wide. The location of the septet bits input to the sixteen inputs and the bits latched by the latch range register are determined by the F-Bar control logic 260 according to the value of four variables as shown in the flowchart of FIG. 12.

Figure 12:
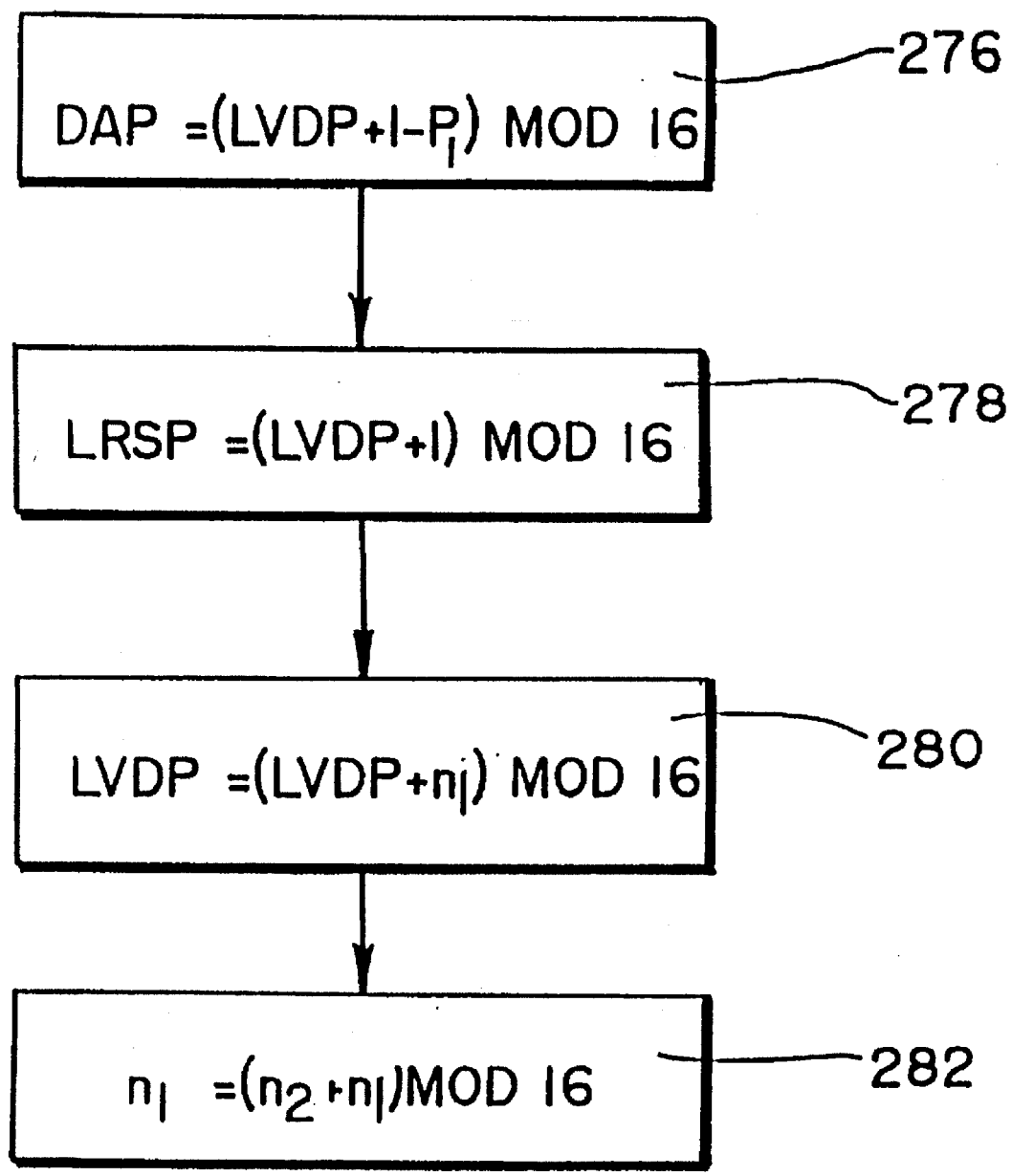
FIG. 12 is a flowchart depicting the operation of the F-bar control logic.

As seen in FIG. 12, a calculation is made to determine the point at which the input septet will be presented to the register 272. This point is called the data alignment position or DAP. DAP is calculated at block 276. The DAP is calculated to be MOD 16 of a value equal to one more than the last valid data position (LVDP) minus any invalid prefix bits of the present sample septet. LVDP is an internal variable of logic 260 which indicates the last position in the register 272 in which a valid data bit was placed in the previous alignment cycle. The septet output from the barrel shifter 268 is then latched into the output register 272 according to the calculation made at block 278. At this point, the septet is latched at the latch range starting position (LRSP) which is MOD 16 of a value equal to one more than the last valid data position. At block 280 the value of LVDP is updated to MOD 16 of the value of the previous LVDP plus the amount of new data ($n_1$) loaded. The value of $n_2$, the count of bits available from register 272, is found to be MOD 16 of a value equal to the old count n2 plus the number of incoming bits $n_1$ as shown in block 282.

When the value of the data alignment position (DAP) is determined, it is input to the barrel shifter 268 over the line 270. The following barrel shifter truth table illustrates how the value of DAP is used along with the input bits to the barrel shifter 268 (BI through HI) so that these bits appear on the desired outputs of the barrel shifter 268 (AO through HO). As seen by the F-Bar truth table, the input bits appear at the output shifted by an amount corresponding to the value of DAP.

| INPUT Data Alignment Position (DAP) | BARREL SHIFTER TRUTH TABLE OUTPUT | | | | | | | |
|---|---|---|---|---|---|---|---|---|
| | AO | BO | CO | DO | EO | FO | GO | HO |
| 0 | x | BI | CI | DI | EI | FI | GI | HI |
| 1 | BI | CI | DI | EI | FI | GI | HI | x |
| 2 | CI | DI | EI | FI | GI | HI | x | BI |
| 3 | DI | EI | FI | GI | HI | x | BI | CI |
| 4 | EI | FI | GI | HI | x | BI | CI | DI |
| 5 | FI | GI | HI | x | BI | CI | DI | EI |
| 6 | GI | HI | x | BI | CI | DI | EI | FI |
| 7 | HI | x | BI | CI | DI | EI | FI | GI |
| 8 | x | BI | CI | DI | EI | FI | GI | HI |
| 9 | BI | CI | DI | EI | FI | GI | HI | x |
| 10 | CI | DI | EI | FI | GI | HI | x | BI |
| 11 | DI | EI | FI | GI | HI | x | BI | CI |
| 12 | EI | FI | GI | HI | x | BI | CI | DI |
| 13 | FI | GI | HI | x | BI | CI | DI | EI |
| 14 | GI | HI | x | BI | CI | DI | EI | FT |
| 15 | HI | x | BI | CI | DI | EI | FI | GI |

The columns labeled Output AO Through HO indicate which input bits appear on particular outputs of barrel shifter 268 for different values of DAP. An x indicates that that particular location does not contain a valid bit. This is an invalid bit in addition to any invalid prefix or suffix bits already present in the septet being processed. This additional bit appears because the barrel shifter is shifting a seven bit quantity in an eight bit field and is thus always generating an invalid bit somewhere in its eight bit output field.

Once the data alignment positioning of the input bits BI-HI has been accomplished, certain positions of the register 272 are latched according to the value of latch range start position as calculated by the F-Bar control logic 260 as previously described. As previously stated, the septet is latched at a latch range starting position which is one more than the last valid data position.

Once the barrel shifter 268 has rotated the location of the bits according to the F-Bar truth table, the bits are latched according to the latch range truth table. As shown, the latch range starting position is indicated in the left hand column and the register positions latched are shown for the input 274 at locations 15 through 0.

| | Latch Range Truth Table | | | | | | | | | | | | | | | |
|---|---|---|---|---|---|---|---|---|---|---|---|---|---|---|---|---|
| INPUT Latch Range Starting | OUTPUT Register Positions Latched (1 = Stored) | | | | | | | | | | | | | | | |
| Position (LRSP) | 15 | 14 | 13 | 12 | 11 | 10 | 9 | 8 | 7 | 6 | 5 | 4 | 3 | 2 | 1 | 0 |
| 0 | 0 | 0 | 0 | 0 | 0 | 0 | 0 | 0 | 0 | 1 | 1 | 1 | 1 | 1 | 1 | 1 |
| 1 | 0 | 0 | 0 | 0 | 0 | 0 | 0 | 0 | 1 | 1 | 1 | 1 | 1 | 1 | 1 | 0 |
| 2 | 0 | 0 | 0 | 0 | 0 | 0 | 0 | 1 | 1 | 1 | 1 | 1 | 1 | 1 | 0 | 0 |
| 3 | 0 | 0 | 0 | 0 | 0 | 0 | 1 | 1 | 1 | 1 | 1 | 1 | 1 | 0 | 0 | 0 |
| 4 | 0 | 0 | 0 | 0 | 0 | 1 | 1 | 1 | 1 | 1 | 1 | 1 | 0 | 0 | 0 | 0 |
| 5 | 0 | 0 | 0 | 0 | 1 | 1 | 1 | 1 | 1 | 1 | 1 | 0 | 0 | 0 | 0 | 0 |
| 6 | 0 | 0 | 0 | 1 | 1 | 1 | 1 | 1 | 1 | 1 | 0 | 0 | 0 | 0 | 0 | 0 |
| 7 | 0 | 0 | 1 | 1 | 1 | 1 | 1 | 1 | 1 | 0 | 0 | 0 | 0 | 0 | 0 | 0 |
| 8 | 0 | 1 | 1 | 1 | 1 | 1 | 1 | 1 | 0 | 0 | 0 | 0 | 0 | 0 | 0 | 0 |
| 9 | 1 | 1 | 1 | 1 | 1 | 1 | 1 | 0 | 0 | 0 | 0 | 0 | 0 | 0 | 0 | 0 |
| 10 | 1 | 1 | 1 | 1 | 1 | 1 | 0 | 0 | 0 | 0 | 0 | 0 | 0 | 0 | 0 | 1 |
| 11 | 1 | 1 | 1 | 1 | 1 | 0 | 0 | 0 | 0 | 0 | 0 | 0 | 0 | 0 | 1 | 1 |
| 12 | 1 | 1 | 1 | 1 | 0 | 0 | 0 | 0 | 0 | 0 | 0 | 0 | 0 | 1 | 1 | 1 |
| 13 | 1 | 1 | 1 | 0 | 0 | 0 | 0 | 0 | 0 | 0 | 0 | 0 | 1 | 1 | 1 | 1 |
| 14 | 1 | 1 | 0 | 0 | 0 | 0 | 0 | 0 | 0 | 0 | 1 | 1 | 1 | 1 | 1 | 1 |
| 15 | 1 | 0 | 0 | 0 | 0 | 0 | 0 | 0 | 0 | 1 | 1 | 1 | 1 | 1 | 1 | 1 |

Logic for latching the selected bits according to the latch range truth table is located in the latch range register 272. This logic constitutes a simple selective latching function that is understood by those skilled in the art and therefore it is not presented here in detail.

The latch range register 272 is divided into two halves, a first half consisting of bits 15 through 8, and a second half consisting of bits 7 through 0. The first half is coupled to a two to one multiplexer 276 through eight parallel lines 278 and the second half is coupled to the multiplexer 278 through eight parallel lines 280. In addition, the multiplexer includes a select line 282 for selecting the next available octet. The multiplexer has an eight bit parallel output 262.

The most significant bit of the four bit value n2 is used to indicate which input to the two to one multiplexer should be selected for output on the eight bit signal 262. If set, input 280 is selected, if reset, input 278 is selected by multiplexer 276. Whenever the most significant bit of n2 changes state (1→0 or 0→1) this indicates that an octet is ready to be read. Also whenever a control value is decoded by logic 110 of FIG. 7 the available octet (or partial octet, if a non-integral number of octets was received between control values) is read along with the control value and the alignment process is reset so that it is ready to begin the septet to octet alignment process for the following frame.

The foregoing description of the invention has been presented for purposes of illustration and description. It is not intended to limit the invention to the precise forms disclosed, and obviously many modifications and variations are possible in light of the above teachings.

For example a 214×15 read only memory (ROM) decode of the values PC1, G and C2 could have generated logic 110 output 112 control values, logic 222 values $n_1$ and $P_1$, and FD-Mux output 214** directly, but not with the same speed and area efficiency as the discrete embodiment that has been described.

If the speed of a ROM based implementation was sufficient the algorithms and logic described in this embodiment would be used to synthesize the contents of such a ROM, in order to allow the coding of the ROM to be completed in a reasonable time frame.

Also, greater parallelism can be achieved in the processing of the transmit and receive streams by utilizing n*8 and n*7 parallel paths. This would basically require n duplicated sets of 8-bit parallel encoding and 7-bit parallel decoding processes respectively. Another method to increase parallelism is to increase the run length boundary from 5 and adjust relevant process parameters accordingly. This approach would not meet ISO 3309, HDLC requirements, however.

It will be understood that various changes in the details and arrangement of the processes that have been herein described and illustrated in order to explain the nature of the invention may be made by those skilled in the art within the principle and scope of the present invention as expressed in the appended claims.

What is claimed is:

1. In an apparatus for the transmission and reception of control and data information consisting of binary digits in a high speed wide area data link connecting a plurality of stations, said stations including at least one sending station and one receiving station, a method for encoding the control and data information into a serial stream of information prior to transmission from the sending station over the data link and for decoding the serial stream of information into the transmitted control and data information upon reception of the serial stream of information at the receiving station, said method comprising the steps of:

sampling and holding the data information in parallel in a clock domain for a communications link comprising data terminal equipment;

counting the number of consecutive ones in said sampled and held parallel data sample in a clock domain for a communications link comprising data terminal equipment;

inserting marking binary digit(s) in a parallel fashion after every fifth consecutive one in said sampled and held parallel data sample in a clock domain for a communications link comprising data terminal equipment;

holding said parallel data sample including said inserted marking binary digit in parallel;

generating a plurality of binary control digits in parallel corresponding to control information in a clock domain for a communications link comprising data terminal equipment;

merging said parallel binary control digits and said parallel data sample including said inserted marking binary digit(s) alternately into a shift register in a clock domain for a communications link comprising data terminal equipment;

shifting said shift register to create a merged serial stream of control information and data information in a clock domain for a communications link comprising data terminal equipment;

transmitting said merged stream of control and data information over the data link in a clock domain for a communications link comprising data communications equipment;

receiving said transmitted merged stream of control and data information from the data link in a clock domain for a communications link comprising data communications equipment;

converting said received merged stream of control and data information into a plurality of seven bit parallel bit samples designed to accommodate a maximum parallel rate, each of said plurality of seven bit parallel bit samples being comprised of seven consecutive bits from said received merged stream of control and data information;

sampling and holding a consecutive number of said seven bit parallel bit samples in a clock domain for a communications link comprising data terminal equipment;

counting the number of ones appearing consecutively in said sampled and held seven bit parallel bit samples in a clock domain for a communications link comprising data terminal equipment;

determining whether said counted ones comprise control information or data information in a clock domain for a communications link comprising data terminal equipment;

removing said marking binary digits from said data information in a clock domain for a communications link comprising data terminal equipment; and reconstructing said data information from data information lacking said marking binary digits in a clock domain for a communications link comprising data terminal equipment.

2. A parallel bit run length coding apparatus for the transmission and reception of control and data information consisting of binary digits in a high speed wide area data link connecting a plurality of stations, said stations including at least one sending station and one receiving station, said apparatus including means for encoding the control and data information into a serial stream of information prior to transmission from the sending station over the data link and means for decoding the serial stream of information into the transmitted control and data information upon reception of the serial stream of information at the receiving station, said parallel bit run length coding apparatus comprising:

means for sampling and holding the data information in parallel in a clock domain for a communications link comprising data terminal equipment;

means for receiving said sampled and held parallel data sample and counting the number of consecutive ones in said sampled and held parallel data sample in a clock domain for a communications link comprising data terminal equipment;

means connected to said counting means for inserting a marking binary digit after the fifth consecutive one in said sampled and held parallel data sample in a clock domain for a communications link comprising data terminal equipment;

means for receiving and holding said parallel data sample including said inserted marking binary digit in parallel in a clock domain for a communications link comprising data terminal equipment;

means for generating a plurality of binary control digits in parallel corresponding to control information in a clock domain for a communications link comprising data terminal equipment;

means for receiving and shifting said parallel binary control digits into a serial stream of control information in a clock domain for a communications link comprising data terminal equipment;

means for receiving and shifting said parallel data sample including said inserted marking binary digit into a serial stream of data information in a clock domain for a communications link comprising data terminal equipment;

means for receiving both said serial stream of control information and said serial stream of data information and merging said streams in a clock domain for a communications link comprising data terminal equipment;

means connected to said merging means for transmitting said merged stream of control and data information over the data link in a clock domain for a communications link comprising data communications equipment;

means connected to the data link for receiving said transmitted merged stream of control and data information in a clock domain for a communications link comprising data communications equipment;

means connected to said receiving means for shifting said received merged stream of control and data information into a plurality of seven bit parallel bit samples designed to accommodate a maximum parallel rate, each of said plurality of seven bit parallel bit samples being comprised of seven consecutive bits from said received merged stream of control and data information;

means connected to said shifting means for sampling and holding a consecutive number of said seven bit parallel bit samples in a clock domain for a communications link comprising data terminal equipment;

means for receiving said seven bit parallel bit samples and counting the number of ones appearing consecutively in said parallel bit samples in a clock domain for a communications link comprising data terminal equipment;

means connected to said counting means for determining whether said counted ones are control information or data information in a clock domain for a communications link comprising data terminal equipment;

means connected to said determination means for removing said inserted marking binary digit from said data information in a clock domain for a communications link comprising data terminal equipment; and means for receiving said data information lacking said inserted marking binary digit and reconstructing said data information in a clock domain for a communications link comprising data terminal equipment.

3. In an apparatus for the coding of control and data information consisting of binary digits in a high speed wide area data link connecting a plurality of stations, said data information containing a marking binary digit, said stations including at least one sending station and one receiving station, a method for decoding a serial stream of control and data information received from the sending station over the data link at the receiving station, said method comprising the steps of:

transmitting said merged stream of control and data information over the data link in a clock domain for a communications link comprising data communications equipment;

receiving said merged serial stream of control and data information from the data link in a clock domain for a communications link comprising data communications equipment;

converting said received serial stream of control and data information into a plurality of seven bit parallel bit samples designed to accommodate a maximum parallel rate, each of said plurality of seven bit parallel bit samples being comprised of seven consecutive bits from said received merged stream of control and data information;

sampling and holding a consecutive number of said seven bit parallel bit samples in a clock domain for a communications link comprising data terminal equipment;

counting the number of ones appearing consecutively in said sampled and held seven bit parallel bit samples in a clock domain for a communications link comprising data terminal equipment;

determining whether said counted ones comprise control information or data information in a clock domain for a communications link comprising data terminal equipment;

removing said marking binary digit from said data information in a clock domain for a communications link comprising data terminal equipment; and reconstructing said data information from data information lacking said marking binary digit in a clock domain for a communications link comprising data terminal equipment.

4. A parallel bit run length decoding apparatus for the reception of control and data information consisting of binary digits in a high speed wide area data link connecting a plurality of stations, said data information containing a marking binary digit, said stations including at least one sending station and one receiving station, said apparatus including means for decoding a serial stream of control and data information received from the sending station over the data link at the receiving station, said parallel bit run length decoding apparatus comprising;

means for transmitting said merged stream of control and data information over the data link in a clock domain for a communications link comprising data communications equipment;

means connected to the data link for receiving said merged serial stream of control and data information in a clock domain for a communications link comprising data communications equipment;

means connected to said receiving means for shifting said received serial stream of control and data information into a plurality of seven bit parallel bit samples designed to accommodate a maximum parallel rate, each of said plurality of seven bit parallel bit samples being comprised of seven consecutive bits from said received merged stream of control and data information;

means connected to said shifting means for sampling and holding a consecutive number of said seven bit parallel bit samples in a clock domain for a communications link comprising data terminal equipment;

means for receiving said seven bit parallel samples and counting the number of ones appearing consecutively in said parallel bit samples in a clock domain for a communications link comprising data terminal equipment;

means connected to said counting means for determining whether said counted ones are control information or data information in a clock domain for a communications link comprising data terminal equipment;

means connected to said determination means for removing said marking binary digit from said information in a clock domain for a communications link comprising data terminal equipment; and means for receiving said data information lacking said marking binary digit and reconstructing said data information in a clock domain for a communications link comprising data terminal equipment.

\* \* \* \* \*